(12) United States Patent
DeWitt

(10) Patent No.: US 6,264,233 B1
(45) Date of Patent: Jul. 24, 2001

(54) VEHICLE AIRBAG ASSEMBLY

(75) Inventor: William L. DeWitt, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/252,256

(22) Filed: Feb. 18, 1999

(51) Int. Cl.$^7$ .................................................. B60R 21/20
(52) U.S. Cl. .......................... 280/728.3; 180/90; 280/732
(58) Field of Search ............................. 280/728.2, 728.3, 280/732, 752; 180/90; 296/70, 73, 208; 454/69

(56) References Cited

U.S. PATENT DOCUMENTS

| | | |
|---|---|---|
| 4,759,568 * | 7/1988 | Paefgen et al. ...................... 280/732 |
| 5,333,901 * | 8/1994 | Barnes ................................. 280/732 |
| 5,393,089 | 2/1995 | Palusky et al. . |
| 5,395,668 | 3/1995 | Ito et al. ................................. 428/43 |
| 5,421,608 | 6/1995 | Parker et al. . |
| 5,427,408 | 6/1995 | Ando et al. . |
| 5,451,075 | 9/1995 | Parker et al. ...................... 280/728.3 |
| 5,456,487 | 10/1995 | Daris et al. ........................ 280/728.3 |
| 5,470,102 | 11/1995 | Smith et al. ....................... 280/728.2 |
| 5,498,027 | 3/1996 | Kelley et al. ...................... 280/728.3 |
| 5,516,145 | 5/1996 | Williams et al. ..................... 280/732 |
| 5,531,471 * | 7/1996 | Terai ..................................... 280/732 |
| 5,533,748 | 7/1996 | Wirt et al. ........................... 280/728.3 |
| 5,556,126 * | 9/1996 | Lee ..................................... 280/728.3 |
| 5,560,646 | 10/1996 | Gray et al. ......................... 280/728.3 |
| 5,569,959 | 10/1996 | Cooper et al. ..................... 280/728.3 |
| 5,580,083 | 12/1996 | Parker ............................... 280/728.3 |
| 5,590,901 | 1/1997 | MacGregor ....................... 280/728.3 |
| 5,626,357 | 5/1997 | Leonard et al. .................. 280/728.3 |
| 5,639,115 | 6/1997 | Kelley et al. . |
| 5,639,116 | 6/1997 | Shimizu et al. ...................... 280/732 |
| 5,662,351 | 9/1997 | Phillion et al. ................... 280/728.3 |
| 5,755,460 | 5/1998 | Barnes et al. ..................... 280/728.3 |
| 5,904,367 * | 5/1999 | Warnez et al. .................... 280/728.3 |
| 6,050,595 * | 4/2000 | Knox ................................. 280/728.3 |

* cited by examiner

Primary Examiner—Daniel G. DePumpo
Assistant Examiner—David R. Dunn
(74) Attorney, Agent, or Firm—Lawrence J. Shurupoff

(57) ABSTRACT

A vehicle safety airbag assembly includes a cover for an airbag canister formed separately from the instrument panel to reduce the overall manufacturing expense. The cover is affixed to a hidden support frame so as to extend through an enlarged opening in the instrument panel to present an appearance of an embossed section of the instrument panel. In one embodiment of the invention, the cover extends laterally beyond the airbag canister to overlie an air conditioner duct located alongside the canister. An opening in the cover conducts air from the duct into the passenger compartment.

2 Claims, 2 Drawing Sheets

VEHICLE AIRBAG ASSEMBLY

BACKGROUND OF THE INVENTION

1. Field of the Invention

This invention relates to a safety airbag assembly for an automotive vehicle, and particularly to a passenger side airbag assembly that includes a homogeneous one-piece plastic cover formed separately from the associated instrument panel. The cover conceals an airbag canister and an air conditioner duct extending alongside the canister. An opening in the cover is operable to direct conditioned air from the duct into the passenger compartment.

2. Description of Prior Developments

In many automotive vehicles the passenger side airbag canister is concealed behind an instrument panel that has hidden score lines or perforations typically configured in an "H" shaped pattern to outline an openable door in alignment with the airbag canister. When the airbag is deployed, the instrument panel is ruptured along the score lines, whereby the door is opened to permit the inflated airbag to expand through the door opening into the passenger compartment. If the cover is formed as a solid plastic molding without any surface covering such as a foam or plastic skin, the score lines formed on the inside surface of the cover causes grooves and other surface imperfections to form on the outer surface of the cover. This presents a significant drawback as far as the appearance of the cover is concerned.

SUMMARY OF THE INVENTION

The present invention relates to a simplified door construction for an airbag canister, wherein the door is formed separately from the instrument panel. The separately-formed door is hinged to a hidden frame for disposition within an enlarged opening in the instrument panel. In a preferred practice of the invention, the door or cover protrudes slightly beyond the plane of the instrument panel so as to have an embossed appearance when viewed by a passenger sifting in facing relation to the instrument panel.

The cover can be designed to span the airbag canister and an air conditioning duct located alongside the canister. A relatively small opening in the cover is aligned with the air conditioning duct for conveying conditioned air into the passenger compartment. During deployment of the airbag, e.g., in a vehicle collision, the cover swings to the open position without disturbing the air conditioning duct and its outlet.

The entire cover swings outwardly during deployment rather than the cover splitting open to allow the airbag to pass therethrough. This feature obviates the need for forming score lines on the inner surface of the cover. By eliminating the score lines, surface imperfections such as grooves and sink holes are prevented from forming on the front or outer surface of the cover. This allows the cover to be formed of a homogeneous plastic molding having a smooth molded outer surface which does not need to be covered with a layer of foam or a sheet of plastic skin. If desired, the smooth molded outer surface of the cover can be painted with any desired color.

Specific features of the invention will be apparent from the attached drawings and description of an illustrative embodiment of the invention.

DESCRIPTION OF A PREFERRED EMBODIMENT OF THE INVENTION

The drawings show the passenger side of an automotive vehicle instrument panel 10 constructed according to the invention. Panel 10 includes an upper shelf portion 12 and a downwardly extending frontal portion 14 facing the passenger seat, not shown. End edge 16 of the instrument panel is located in near proximity to the front door on the passenger side of the vehicle. The driver side of the instrument panel is not visible in FIG. 1.

Figure 1:
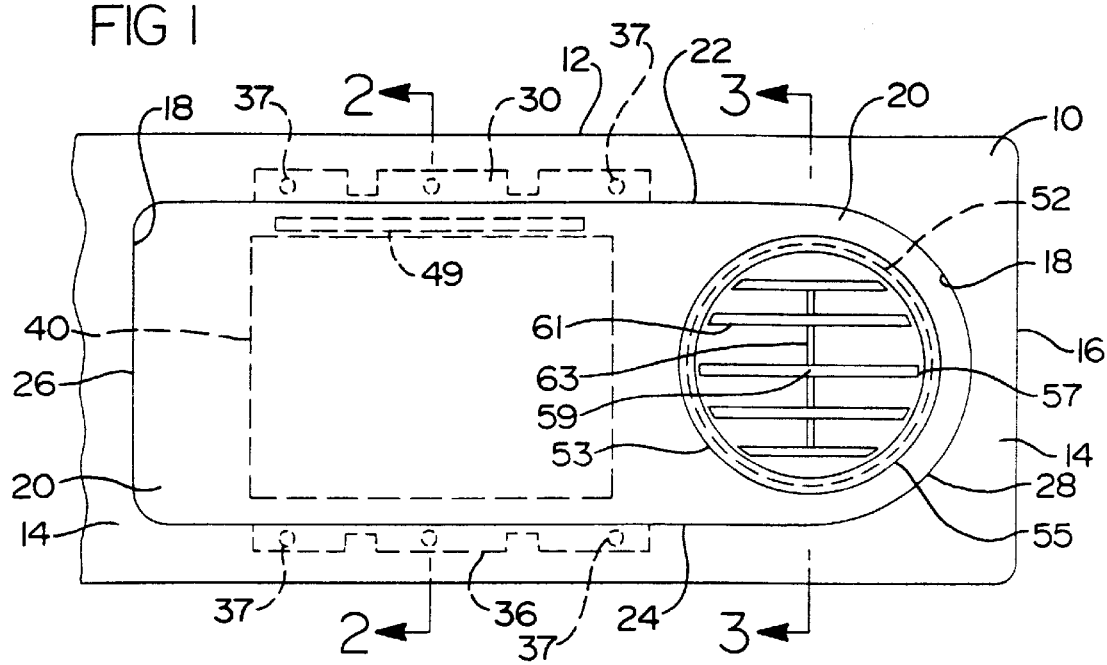
FIG. 1 is a fragmentary front elevational view of an instrument panel having a passenger side airbag assembly of the present invention installed therein.

Instrument panel 10 has a relatively large opening 18 that accommodates a cover 20 for an airbag assembly on the passenger side of the vehicle. As shown in FIG. 1, cover 20 has an upper edge 22, a lower edge 24, a left edge 26, and a right edge 28. As depicted in FIG. 1, edge 28 has a semi-circular configuration that gives the cover a unique ornamental appearance. However, edge 28 could be a linear edge similar to edge 26 if so desired. The cover has a close tolerance disposition relative to the associated edges of panel opening 18, such that a person sitting in the vehicle views the cover as part of the instrument panel. In fact, cover 20 is entirely separate from the instrument panel.

Cover 20 has a flange 30 extending upwardly from its upper edge so as to lie against a rigid support frame 32 that is concealed by the instrument panel. Support frame 32 includes an upper rail located in close proximity to shelf portion 12, and a lower rail 34 located behind a tear-away flange 36 that extends downwardly from the lower edge 24 of cover 20. Screws or bolts 37 affix the cover flanges 30 and 36 to vertical rail surfaces on support frame 32, whereby cover 20 is rigidly secured to the concealed frame 32.

Frame 32 has an opening therein sized to receive an airbag canister 40 that may be of generally conventional construction. The canister includes a pressurized gas source 42 that communicates with an airbag 44 suitably anchored within canister 40. When an electrical signal is delivered to a squib within the canister, pressurized gas is generated by thermal chemical reaction, thus inflating the airbag in known fashion.

Figure 2:
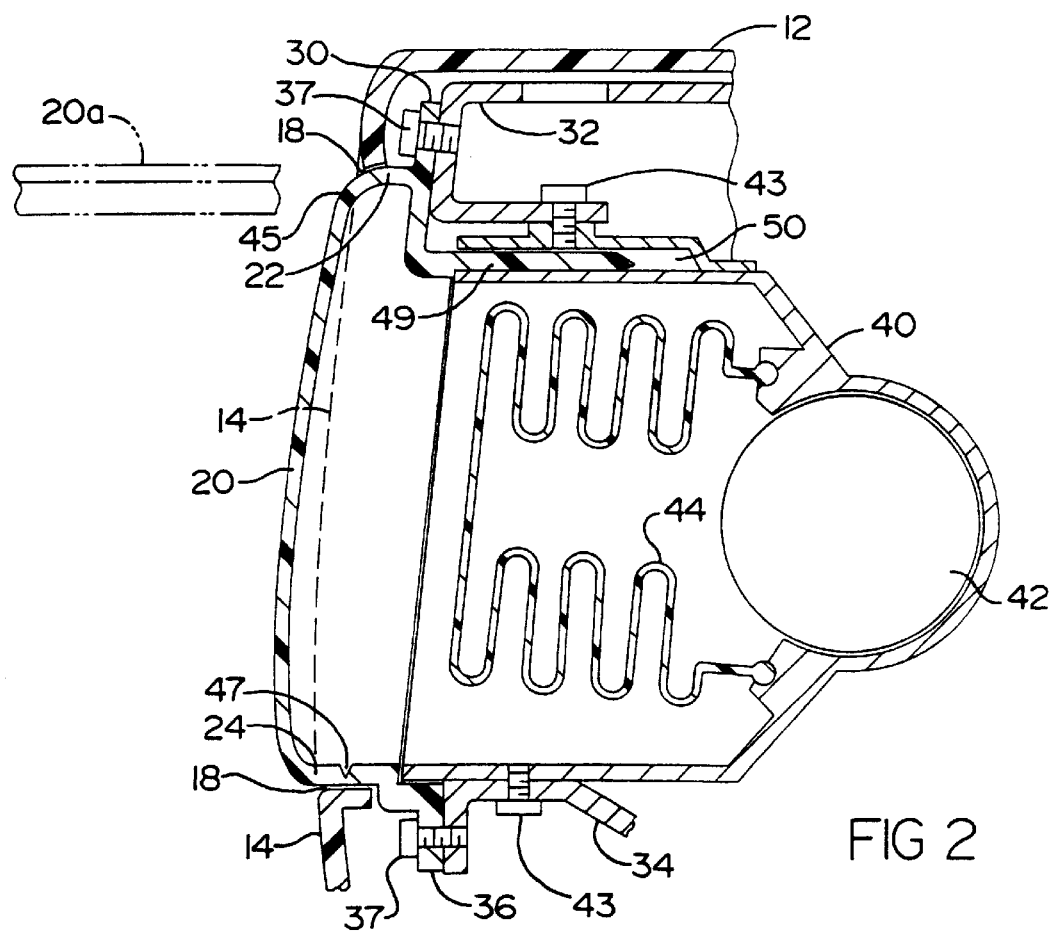
FIG. 2 is a transverse sectional view taken on line 2—2 in FIG. 1.

Airbag canister 40 can be affixed to support frame 32 by screws 43. As shown in FIG. 2, the canister upper and lower walls seat against horizontal surfaces on the frame rails; screw fasteners 43 extend through the rails into threaded holes in the canister walls. Since cover 20 and airbag canister 40 are both affixed to frame 32, the cover has a fixed orientation relative to the airbag canister, even though the cover is not directly secured to the canister. Support frame 32 absorbs the load forces imposed by the airbag canister and cover 20 during airbag deployment. Frame 32 also serves as an orientation device for orienting cover 20 relative to the airbag canister.

The cover upper edge 22 that adjoins flange 30 forms a living hinge 45, whereby cover 20 is enabled to swing upwardly from the closed position to an open position during airbag deployment. In FIG. 1, the open position of the cover is denoted fragmentarily by dashed line 20a.

The cover lower edge 24 that adjoins flange 36 has a notch or linear score line 47 extending the full length of flange 36. During airbag deployment the expanding airbag exerts a near explosive force on cover 20 (upwards of sixty p.s.i.), whereby the cover is torn along a weakened tear line such as notch 47 which extends along the top edge of tear-away flange 36. The cover swings upwardly around the hinge connection 45, to enable the airbag to expand into the passenger compartment. Hinge connection 45 can be reinforced by an integral spade wall 49 extending from the cover into a slot 50 formed in the upper wall of the airbag canister. Spade wall 49 helps to retain the cover on the airbag canister. The tear-away action is confined to the cover lower edge, specifically the notch 47 area of the cover.

The cover shown in FIG. 1 extends laterally beyond airbag canister 40 to extend in front of an air conditioner duct 52. The cover spans both the airbag canister and the air conditioner outlet to enhance the appearance of the cover as being an integral part of the instrument panel.

Figure 3:
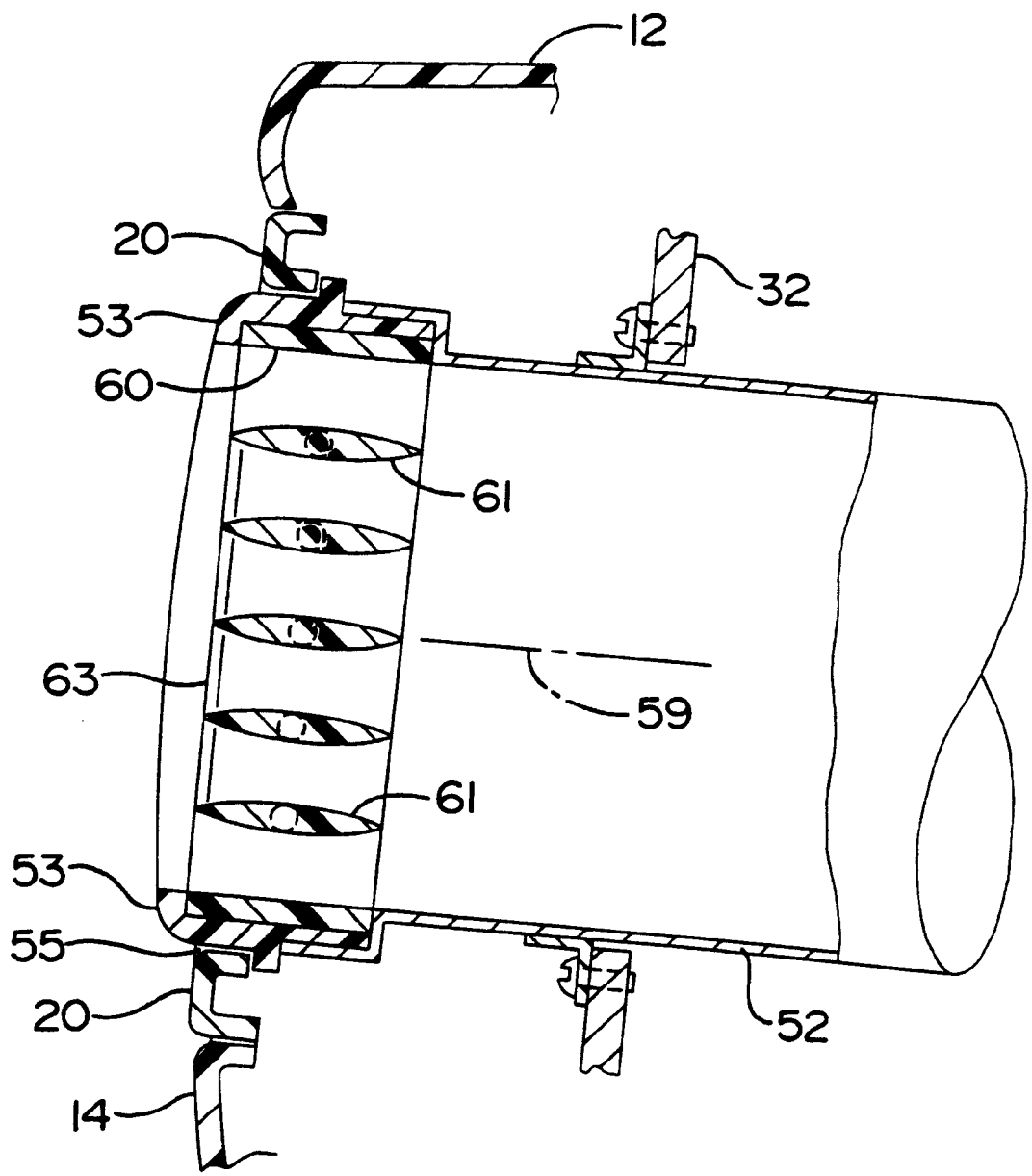
FIG. 3 is a transverse sectional view taken on line 3—3 in FIG. 1.

As shown in FIG. 3, duct 52 is affixed to the support frame 32 in the space behind cover 20. The duct includes a circular shroud 53 that extends into and through a relatively small circular opening 55 in cover 20. Opening 55 is aligned coaxially with the duct 52. A louver assembly 57 is pivotably mounted in shroud 53 for rotation around axis 59 of the circular opening.

The louver assembly includes a circular ring 60 and an array of pivotal louvers 61 linked together by a tie rod 63. Ring 60 can be rotated to control the direction of airflow from duct 52 into the passenger compartment. Louvers 61 can be pivoted in unison around the midplane of ring 60 to vary the air flow rate and direction.

There is a slight clearance between shroud 53 and the edge of circular opening 55, so that when the airbag is deployed cover 20 will swing upwardly around hinge connection 45 (FIG. 1) without disturbing shroud 53 or the louver assembly.

An important feature of the invention is that cover 20 protrudes a slight distance beyond the plane of instrument panel surface 14, as shown in FIG. 1, such that the cover has an embossed appearance. The cover appears to be an integral part of the instrument panel; however, in fact, the cover is a separate low cost molding designed to reduce the overall cost of incorporating the passenger airbag into the instrument panel.

In the manufacturing operation, duct 52 is mounted to the support frame 32 as the first step. Then cover 20 is affixed to airbag canister 40 by means of the screws 43. Because the cover 20 is formed from a single plastic molding and is free of any supplemental foam covering and plastic skin, cover 20 is most economical to manufacture. The foam and skin coverings can be eliminated due to the absence of any molded score lines on the inner surface of cover 20. Such score lines typically form depressions, grooves or sink lines on the front of the cover.

By placing the score line on the flange 36 in the form of notch 47, the rear surface of cover 20 is free of score lines and the front surface of the cover is thereby free of molding imperfections typically caused by such score lines.

A particular novel feature of the invention is the incorporation of an air conditioning outlet in a one-piece homogeneous molded airbag cover which swings open in its entirety, including the air conditioning outlet. Cover 20 appears to be an embossed part of the instrument panel, although it is in fact a separately formed component.

What is claimed:

1. A passenger side airbag assembly, comprising:
    a support frame having an upper horizontal rail and a lower horizontal rail located substantially directly below said upper rail;
    a rigid instrument panel (10) overlying said support frame so as to conceal said frame from the vehicle passenger space; said panel having a first relatively large opening (18) therein;
    an airbag canister (40) located in a concealed position behind said instrument panel in alignment with said first opening; said airbag canister having an upper wall fastened to said upper rail, and a lower wall fastened to said lower rail, whereby said frame rigidly supports said canister in a fixed position relative to the instrument panel;
    a horizontal air conditioning duct located behind said instrument panel adjacent to said airbag canister;
    a rigid airbag cover (20) located within said first opening so as to conceal the airbag canister; said cover having a second relatively small opening (55) aligned with said air conditioning duct;
    said cover having an upper flange (30) fastened to said upper rail, and a lower flange (36) fastened to said lower rail, whereby said frame rigidly supports said cover in a fixed position relative to the instrument panel;
    said lower flange having a weakened tear line (47) extending therealong, such that during airbag deployment the tear line is severed to enable said cover to swing upwardly around the cover upper flange to an open position;
    said cover spanning said airbag canister and said air conditioning duct, so that said second opening in said cover has clearance with respect to said air conditioning duct, whereby the cover can swing to the open position without disturbing the air conditioning duct;
    said cover having an outer surface that protrudes slightly beyond the surface plane of the instrument panel, whereby the cover has an embossed appearance and
    wherein said upper rail has a first vertical surface facing said cover, and a first horizontal surface facing the canister upper wall; said cover upper flange being fastened to said first vertical surface, and said canister upper wall being fastened to said first horizontal surface;
    said lower rail having a second vertical surface facing said cover, and a second horizontal surface facing the canister lower wall; said cover lower flange being fastened to said second vertical surface, and said canister lower wall being fastened to said second horizontal surface.

2. A passenger side airbag assembly, comprising:
    a support frame having an upper horizontal rail and a lower horizontal rail located substantially directly below said upper rail;
    a rigid instrument panel (10) overlying said support frame so as to conceal said frame from the vehicle passenger space; said panel having a first relatively large opening (18) therein;
    an airbag canister (40) located in a concealed position behind said instrument panel in alignment with said first opening; said airbag canister having an upper wall fastened to said upper rail, and a lower wall fastened to said lower rail,
    whereby said frame rigidly supports said canister in a fixed position relative to the instrument panel;
    a horizontal air conditioning duct located behind said instrument panel adjacent to said airbag canister;
    a rigid airbag cover (20) located within said first opening so as to conceal the airbag canister; said cover having a second relatively small opening (55) aligned with said air conditioning duct;

said cover having an upper flange (30) fastened to said upper rail, and a lower flange (36) fastened to said lower rail, whereby said frame rigidly supports said cover in a fixed position relative to the instrument panel;

said lower flange having a weakened tear line (47) extending therealong, such that during airbag deployment the tear line is severed to enable said cover to swing upwardly around the cover upper flange to an open position;

said cover spanning said airbag canister and said air conditioning duct, so that said second opening in said cover has clearance with respect to said air conditioning duct, whereby the cover can swing to the open position without disturbing the air conditioning duct;

said cover having an outer surface that protrudes slightly beyond the surface plane of the instrument panel, whereby the cover has an embossed appearance and wherein said upper wall of the airbag canister has a slot (50) therein communicating with said cover below said upper flange, said cover having a spade wall (49) extending from said upper flange into said slot to stabilize the upper edge of said cover during airbag deployment.

\* \* \* \* \*